Feb. 20, 1951 A. KREITHEN 2,542,087
NEUTRALIZATION OF AMPLIFIERS
Filed Feb. 15, 1947
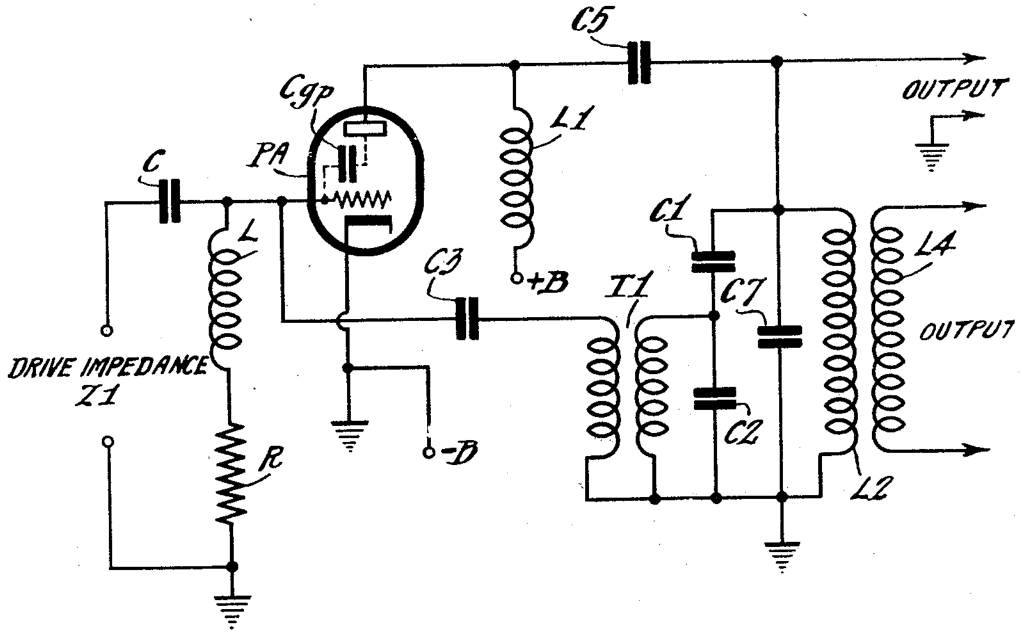
INVENTOR.
Alexander Kreithen
BY H. G. Grover
ATTORNEY Patented Feb. 20, 1951

2,542,087

UNITED STATES PATENT OFFICE 2,542,087

NEUTRALIZATION OF AMPLIFIERS

Alexander Kreithen, Philadelphia, Pa., assignor to Radio Corporation of America, a corporation of Delaware Application February 15, 1947, Serial No. 728,847

3 Claims. (Cl. 179—171)

This application discloses an improved neutralized power amplifier and has as its main object provision of a method and means for neutralizing a single ended power amplifier over a band of frequencies.

In the prior art, of neutralized power amplifiers, it has been found difficult to properly neutralize the same over a relatively wide band of frequencies such as, for example, a range of 2 or 3 to 1 such as might be used in a broadcast set-up operating from 550 to 1500 kc.

In known neutralizers, such as shunt neutralizers, an inductance is put in shunt to the plate and grid internal tube capacity to tune the capacity out. This is done by dimensioning the inductance so that with the internal capacity, resonance at the operating frequency is established. This provides a high impedance between the grid and plate to prevent feed back. However, the magnitude of the inductance has to be adjusted for every change in the operating frequencies.

Furthermore, the power amplifier cannot be "tuned up" until the inductance is right. This makes it necessary to disconnect the plate voltage and with a meter in circuit, tune the inductance for minimum tank current. Then, with the plate voltage on again, the plate tank is tuned for resonance and maximum current and so forth with a possible repetition of the operation.

In bridge type neutralization circuits, the input must be single ended when the output is split or up from the ground at both sides and vice versa. Where a single ended output is feeding a power amplifier input which is single ended and a single ended power output amplifier is desired, a bridge circuit cannot be used.

An object of my invention is provision of improved means for neutralizing a power amplifier over a wide band of frequencies without requiring any adjustment other than the initial setting.

A further object of my invention is to enable power amplifiers to have both single ended input and single ended output or double ended input and output or single ended input and double ended output or vice versa.

A further object of my invention is to provide improved means for obtaining a neutralized voltage without using the full plate voltage of the stage neutralized. This is of first importance because it permits one to work with lower voltages in the neutralizing circuit.

An additional object of the present invention is to provide a neutralizing system wherein the neutralizing voltage magnitude is independent of the power amplifier load. Moreover, in my system, the neutralizing adjustment is independent of the plate voltage so that the power amplifier tank circuit may be tuned without changing the neutralizing connections.

In its broadest aspects, my invention consists of means for obtaining a voltage displaced in phase 180° relative to the radio frequency plate voltage and a circuit for feeding voltage back to the grid of the amplifier thereby cancelling the voltage fed through the grid to plate capacity of the tube. The means for obtaining the 180° phase reversal is a radio frequency transformer having a one to one turns ratio from the primary to the secondary. The primary of the transformer is connected to a capacitive voltage divider across the plate to cathode voltage of the amplifier. A selected fraction (less than 1) of the power amplifier plate voltage is to be fed back to the grid in proper phase relation and amplitude to neutralize the voltage which is fed back within the tube.

In the detailed description which follows, reference will be made to the attached drawing, wherein the single figure illustrates one embodiment of my neutralizing circuit as used in a power amplifier stage.

In the drawing, PA is the power amplifier tube having its control grid connected in a conventional manner by a coupling and direct current blocking condenser C to the high potential end of a drive impedance, not shown, but represented by Z1. The other end of this drive impedance is grounded and thereby connected to the cathode of PA. R is a combination grid leak and bias resistor while L is a radio frequency choke used between the grid and the bias resistor R to hold the grid at high radio frequency impedance with respect to ground. *Cgp* represents the tube grid to plate capacity wherein the undesired feed back which is to be neutralized takes place. L1 is a radio frequency choke through which the direct current is applied to the plate. C5 is a coupling and direct current blocking capacitor connecting the plate to the tank circuit L2 C7. The output may be supplied by a lead connected to the high potential end of L2 or by a winding L4 coupled to L2. The plate to cathode circuit is shunted by a capacitive voltage divider including condensers C1, C2. The tank circuit is tuned to resonance by inductance L2 and capacitor C7, taking into consideration the capacity added by condensers C1 and C2. Either L2 or C7 or both may be variable to tune the system. T1 is a transformer with a primary coupled in shunt to C2 to feed the neutralizing voltage into coupling condenser C3 and thence to the grid of the power amplifier. The coupling T1 is a minus one to one ratio transformer.

The conditions to be satisfied are such that the voltage due to the plate to grid capacity be exactly cancelled by the voltage fed to the grid by C3. If the voltage $e_n = e_p/N$, N being determined by the values of C1 and C2, where $e_p$ is the signal voltage across the output circuit and $e_n$ is the voltage applied to C3 from T1, then:

$$X_{C3} = \frac{Z_1 + X_{C_{gp}} + NZ_1}{N}$$

where $X_{C3}$ and $X_{C_{gp}}$ respectively represent the impedance of $C_3$ and $C_{gp}$. Since, in practice, $X_{C_{gp}}$ is very much greater than $Z_1$, say more than ten times as great, the following approximation may be used:

$$X_{C3} = \frac{X_{C_{gp}}}{N}$$

and therefore C3 depends on the fraction of $e_p$ it is desired to use.

I have used this circuit in a 250 watt broadcast transmitter development over the range 540–1520 kc. with N=5, which means that T1 can be made very small, since it will not have many volts across it.

Inspection of the equations given above will show that the ratio of the capacitor C3 to the capacitor $C_{gp}$ is made substantially equal to the ratio of the total signal plate voltage to the voltage $e_n$ across the transformer primary winding. Then, obviously, a change in the load carried by the power amplifier or in adjustment of the point of resonance of the tank circuit within reasonable limits will have no effect on the completeness of the neutralizing operation.

What is claimed is:

1. In apparatus for neutralizing over a band of frequencies a power amplifier including a tube having an anode, a cathode and a control grid and a parallel tuned output circuit for said tube connected between said anode and cathode, the combination comprising a capacitive voltage divider connected substantially across said output circuit, a one-to-one transformer having a primary connected to said voltage divider to receive a fractional portion of the output voltage of said output circuit and having a secondary inductively coupled to said primary, and a capacitor connecting the output of said secondary to the grid of said tube, the ratio of the capacitance values of the grid-to-anode capacitance of said tube and said capacitor being about equal to the ratio of said fractional portion of the output voltage to the total output voltage.

2. A broad band neutralized amplifier circuit comprising a power amplifier tube having an anode, a cathode and a control grid, an output circuit for said tube connected between said anode and cathode, a capacitance voltage divider connected substantially across said output circuit, a one-to-one transformer having a primary connected to said voltage divider to receive a fractional portion of the output voltage of said output circuit and having a secondary inductively coupled to said primary, and a capacitor connecting the output of said secondary to the grid of said tube, the ratio of the capacitance values of the grid-to-anode capacitance of said tube and said capacitor being about equal to the ratio of said fractional portion of the output voltage of the total output voltage.

3. A broad band neuralized amplifier circuit comprising a power amplifier tube having an anode, a cathode and a control grid, a tuned output circuit for said tube comprising a parallel connected inductance and capacitance connected between said anode and cathode, a capacitive voltage divider connected substantially across said output circuit, a one-to-one transformer having a primary connected to said voltage divider to receive a fractional portion of the output voltage of said output circuit and having a secondary inductively coupled to said primary, and a capacitor connecting the output of said secondary to the grid of said tube, the ratio of the capacitances of the grid-to-anode capacitance of said tube and said capacitor being about equal to the ratio of said fractional portion of the output voltage to the total output voltage.

ALEXANDER KREITHEN.

REFERENCES CITED

The following references are of record in the file of this patent:

UNITED STATES PATENTS

| Number | Name | Date |
|---|---|---|
| 1,489,228 | Hazeltine | Apr. 1, 1924 |
| 1,763,015 | Stevenson | June 10, 1930 |
| 1,848,912 | Taylor | Mar. 8, 1932 |
| 2,003,282 | Black | June 4, 1935 |
| 2,404,809 | O'Brien | July 30, 1946 |

OTHER REFERENCES

Terman, "Radio Engineering," 1937 2nd ed., McGraw Hill Book Co., N. Y., pages 235 to 238.